US00RE40064E

(19) United States
(12) Reissued Patent
Tokuno et al.

(10) Patent Number: US RE40,064 E
(45) Date of Reissued Patent: Feb. 19, 2008

(54) STRUCTURE OF FLOOR SLAB BRIDGE

(75) Inventors: Mitsuhiro Tokuno, Ishikawa-ken (JP); Kazutoshi Tsuda, Ishikawa-ken (JP); Fumihiro Saito, Ishikawa-ken (JP)

(73) Assignees: Asahi Engineering Co., Ltd., Ishikawa-ken (JP); Eco Japan Co., Ltd., Ishikawa-ken (JP)

(21) Appl. No.: 11/522,508

(22) Filed: Sep. 18, 2006

Related U.S. Patent Documents

Reissue of:
(64) Patent No.: 6,792,638
Issued: Sep. 21, 2004
Appl. No.: 10/395,109
Filed: Mar. 25, 2003

(30) Foreign Application Priority Data

Mar. 26, 2002 (JP) ..... 2002-86134

(51) Int. Cl.
*E01D 19/12* (2006.01)

(52) U.S. Cl. ..... 14/73; 14/77.1
(58) Field of Classification Search ..... 14/73, 14/73.1, 77.1; 52/335, 220.3
See application file for complete search history.

(56) References Cited

U.S. PATENT DOCUMENTS

| | | | | |
|---|---|---|---|---|
| 3,812,636 | A | 5/1974 | Albrecht et al. | 52/334 |
| 3,894,370 | A | 7/1975 | Parazader | 52/220.3 |
| 4,115,971 | A | 9/1978 | Varga | 52/334 |
| 4,615,166 | A | 10/1986 | Head | 52/309.11 |
| 4,653,237 | A | 3/1987 | Taft | 52/335 |
| 4,972,537 | A | 11/1990 | Slaw, Sr. | 14/77.1 |
| 6,023,806 | A | 2/2000 | Dumlao et al. | 14/73 |
| 6,279,281 | B1 | 8/2001 | Lee | 52/335 |
| 6,467,118 | B2 | 10/2002 | Dumlao et al. | 14/73 |
| 2003/0046779 | A1 | 3/2003 | Dumlao et al. | 14/2.4 |

FOREIGN PATENT DOCUMENTS

| | | | |
|---|---|---|---|
| FR | 2453955 | | 12/1980 |
| FR | 2453955 A | * | 12/1980 |
| JP | 51-150831 | | 12/1976 |
| JP | 56-5710 | | 1/1981 |
| JP | 58-33611 | | 2/1983 |
| JP | 58-37255 | | 3/1983 |
| JP | 03-247805 | | 11/1991 |
| JP | 03-125808 | | 12/1991 |
| JP | 08-10756 | | 4/1996 |
| JP | 03247805 A | * | 8/1997 |
| JP | 9-221717 | | 8/1997 |

* cited by examiner

*Primary Examiner*—Raymond Addie
(74) *Attorney, Agent, or Firm*—Wenderoth, Lind & Ponack, L.L.P.

(57) ABSTRACT

A construction of a floor slab bridge includes a plurality of columnar H-shaped steels each disposed between adjacent bridge legs and arranged in side-by-side relation with an end face of a lower flange abutted with a corresponding end face of the adjacent columnar H-shaped steel. A lower concrete layer is formed by placing concrete in a space defined between the upper and lower flanges and between adjacent web plates through a concrete inlet port formed between the adjacent upper flange, and an upper concrete layer is formed by placing concrete on the upper flange. An iron reinforcement is horizontally disposed on the upper flanges, and an iron reinforcement is suspended in the space from the horizontal iron reinforcement through the concrete inlet port.

18 Claims, 8 Drawing Sheets

STRUCTURE OF FLOOR SLAB BRIDGE

Matter enclosed in heavy brackets [ ] appears in the original patent but forms no part of this reissue specification; matter printed in italics indicates the additions made by reissue.

*This application is a reissue application of U.S. Pat. No. 6,792,638, issued Sep. 21, 2004.*

BACKGROUND OF THE INVENTION

1. Field of the Invention

This invention relates to a structure of a floor slab bridge in a bridge built up in a river or on land, and more particularly to a structure of a floor slab bridge in which a columnar H-shaped steel is used as a main girder material.

2. Related Art

A floor slab bridge is disclosed by Japanese Patent Application Laid-Open Publication No. H09-221717 as typically illustrated in its FIGS. 1 and 2, in which steel sheet piles 11 are used as a bottom plate, T-shaped steels or H-shaped steels (main girder member 13) are welded to the steel sheet piles 11 such that the T-shaped steels or H-shaped steels are spacedly arranged thereon. Adjacent steel sheet piles 11 are joined by pawls 12 disposed at left and right side end faces of each steel sheet pile 11. Concrete is placed in a space between an upper flange of each T-shaped steel or H-shaped steel and the steel sheet pile 11 through a concrete inlet port which is formed between the upper flanges of each T-shaped steel or H-shaped steel so that a lower concrete layer is formed, and concrete is placed on the upper flange so that an upper concrete layer is formed, wherein the upper concrete layer is to be joined with the lower concrete layer through the concrete inlet port.

Similarly, FIG. 5 of the above publication shows a floor slab bridge in which a plurality of T-shaped steels or H-shaped steels are arranged in side-by-side relation on a bottom plate 3 composed of a single steel plate and concrete is placed thereon.

In those floor slab bridges, a side plate 16 is applied to the outer side surface of the side concrete layer placed on the outer side surface of the leftmost or rightmost T-shaped steel or H-shaped steel, and in the floor slab bridge shown in FIGS. 1 and 2, a PC steel material 18 is pierced through a web plate formed of T-shaped steel or H-shaped steel, which are arranged in a side-by-side relation, a lower concrete layer and a block which is called a cross girder 19, from the outer side surface of the side plate 16. Both ends of the PC steel material 18 are fastened at the outer side surfaces of the side plates 16, and play at the joint part of the pawl 12 is set to a maximum, thereby applying a pre-stress to the concrete layer. Necessarily, the PC steel material 18 used as this pre-stress means is left in its exposed state at the fastening parts on both ends at the outer side surfaces of the side plates 16.

In the above-mentioned conventional structure(s), the bottom plate is formed by the steel sheet piles 11, and the T-shaped steels or H-shaped steels are spacedly arranged in side-by-side relation on the bottom plate as in the manner mentioned above. Play at the joint part of the pawl 12 of the steel sheet pile 11 is set to a maximum. After the concrete is cured, the PC steel material 18 is fastened at the outer side surfaces of the side plates 16, thereby applying a pre-stress to the concrete layer. The PC steel material 18 pierces through the cross girder 19, with play, thus enabling a fastening which can apply the pre-stress. Accordingly, the PC steel material 18 is not joined with the concrete at all. This means that the PC steel material 18 does not function as a concrete reinforcement.

Therefore, if a vertical load (live load) attributable to a passage of vehicles, etc. is applied to the floor slab bridge, a shearing force would act on the concrete layer which would induce cracking of the concrete layer.

Moreover, since the PC steel material 18 is fastened at the outer side surfaces of the two side plates 16, the load is totally applied to the fastening parts of the side plates 16, thus resulting in a collapsing and/or twisting of the side plates 16.

In addition, since the fastening parts are exposed from the side plates 16, i.e., from the concrete layer, the fastening parts become rotten due to wind, rain or the like so as to degrade their original function and to spoil the outer appearance of the floor slab bridge.

Moreover, it is very troublesome to fillet weld each and every T-shaped steel or H-shaped steel over its entire length to the bottom plate 3 and the steel sheet piles 11 at constant intervals. Thus, the labor time is increased and the cost is increased, too.

The present invention has been accomplished in view of the above problems.

SUMMARY OF THE INVENTION

It is, therefore, an object of the present invention to provide a structure of a floor slab bridge which can be properly formed by forming a main girder structure using commercially available columnar H-shaped steels and applying concrete thereto.

In order to achieve the above object, according to one aspect of the present invention, there is provided a structure of a floor slab bridge comprising a plurality of columnar H-shaped steels each of which includes a web plate having at an upper end thereof an upper flange and at a lower end thereof a lower flange, the columnar H-shaped steels being arranged in side-by-side relation with an end face thereof abutted with a corresponding end face of an adjacent columnar H-shaped steel, the upper flanges being smaller in width than the lower flanges so that a concrete inlet port is formed between adjacent upper flanges; a lower concrete layer forming by placing concrete in a space defined between the upper and lower flanges and between the adjacent web plates through the concrete inlet port; an upper concrete layer formed by placing concrete on the upper flange and connected to the lower concrete layer through the concrete inlet port; a horizontal iron reinforcement horizontally laid on each of the upper flanges; a suspending iron reinforcement suspended in the space through the concrete inlet port; and the horizontal iron reinforcement being embedded in the upper concrete layer and the suspending iron reinforcement being embedded in the lower concrete layer.

By the horizontal iron reinforcement and the suspending iron reinforcement suspended therefrom, the joining strength between the upper concrete layer and the lower concrete layer, particularly the lower concrete layer demarcated by the web plate is properly reinforced, thereby providing sufficient strength to the entire floor slab bridge.

Thus, the shearing resisting force of the concrete against the live load is increased to effectively prevent cracking.

The columnar H-shaped steels generally of JIS specifications each having an upper flange which is cut in such a manner so as to have a predetermined width are arranged in a side-by-side relation between adjacent bridge legs with the adjacent lower flanges abutted with each other, and concrete is placed thereon. Merely by doing so, a floor slab bridge can be constructed at a low cost and with a reduced amount of labor time.

According to another aspect of the present invention, there is provided a structure of a floor slab bridge comprising a plurality of columnar H-shaped steels each of which includes a web plate having at an upper end thereof an upper flange and at a lower end thereof a lower flange, a joining plate made of a steel material being interposed between every adjacent pair of lower flanges, left and right end faces of each of the joining plates being in abutment relation with corresponding end faces of lower flanges of the adjacent left and right columnar H-shaped steels, a concrete inlet port being formed between every adjacent pair of upper flanges with the help of the joining plate; a lower concrete layer formed by placing concrete in a space formed between the upper and lower flanges and between the adjacent web plates through the concrete inlet port; and an upper concrete layer formed by placing concrete on the upper flange and connected to the lower concrete layer through the concrete inlet port.

By employment of the joining plate, the time and labor for dimensioning the upper flange smaller in width than the lower flange can be eliminated. The columnar H-shaped steels of JIS specifications can be used as they are. Accordingly, a floor slab bridge can be constructed at a low cost and with a reduced amount of labor time. Moreover, by properly selecting the width of the joining plate, the width dimension of the bridge can be set easily.

According to a further aspect of the present invention, there is provided a structure of a floor slab bridge comprising a plurality of columnar H-shaped steels each of which includes a web plate having at an upper end thereof an upper flange and at a lower end thereof a lower flange, the columnar H-shaped steels being arranged in a side-by-side relation with an end face thereof abutted with a corresponding end face of the adjacent columnar H-shaped steel, the web plate being pierced therethrough by a web through-bar, a plurality of the web through-bars being arranged in the longitudinal direction of the bridge at small intervals, a stopper such as a nut, which is to be abutted with an outer side surface of each of the leftmost and rightmost columnar H-shaped steels, the upper flanges being smaller in width than the lower flanges so that a concrete inlet port is formed between adjacent upper flanges; a lower concrete layer formed by placing concrete in a space defined between the upper and lower flanges and between the adjacent web plates through the concrete inlet port; an upper concrete layer formed by placing concrete on the upper flange and connected to the lower concrete layer through the concrete inlet port; and the web through bar being embedded in the lower concrete layer so as to serve as a concrete reinforcement, opposite ends of the web through-bar and the stopper being embedded in side concrete layers which are placed on outer side surfaces of the leftmost and rightmost columnar H-shaped steels.

The web through-bar is preferably of the type having a head (stopper) at one end thereof. A nut (stopper) is threadingly engaged with the other end of the web through-bar so as to fasten to the outer side surfaces of the web plate of the leftmost and rightmost columnar H-shaped steels. It is also accepted that a nut is threadingly engaged with each end of the web through-bar to fasten to the outer side surfaces of the leftmost and rightmost columnar H-shaped steels.

This fastening force is preferably not so large so as to give an abutting force to the abutting parts of the adjacent lower flanges of the columnar H-shaped steels. That is, it is preferred that the adjacent lower flanges of the columnar H-shaped steels are merely loosely contacted (a small space may be formed between the adjacent lower flanges) with each other.

The web through-bar is embedded in the lower concrete layer so as to serve as a concrete reinforcement. Moreover, the shearing resisting force against the live load to be imposed on the concrete layer is increased. This effectively prevents concrete cracking. In addition, by embedding the stoppers and opposite end parts of the web through-bar in the side concrete layers, they can be prevented from becoming rotten due to wind, rain or the like and the outer appearance is not spoiled.

Preferably, the joining plate is provided with a reinforcement plate which is erected from an upper surface of the joining plate and embedded in the lower concrete layer. Due to this arrangement, the main girder component members of a bridge can be increased in strength, and the joining plate and the lower concrete layer can be firmly joined together.

The horizontal iron reinforcement and the suspending iron reinforcement may be used in combination with the joining plate and the web through-bar, where appropriate. By doing so, those elements can function synergistically.

DETAILED DESCRIPTION OF THE EMBODIMENT

Embodiments of the present invention will now be described hereinafter with reference to FIGS. 1 through 9.

Figure 1:
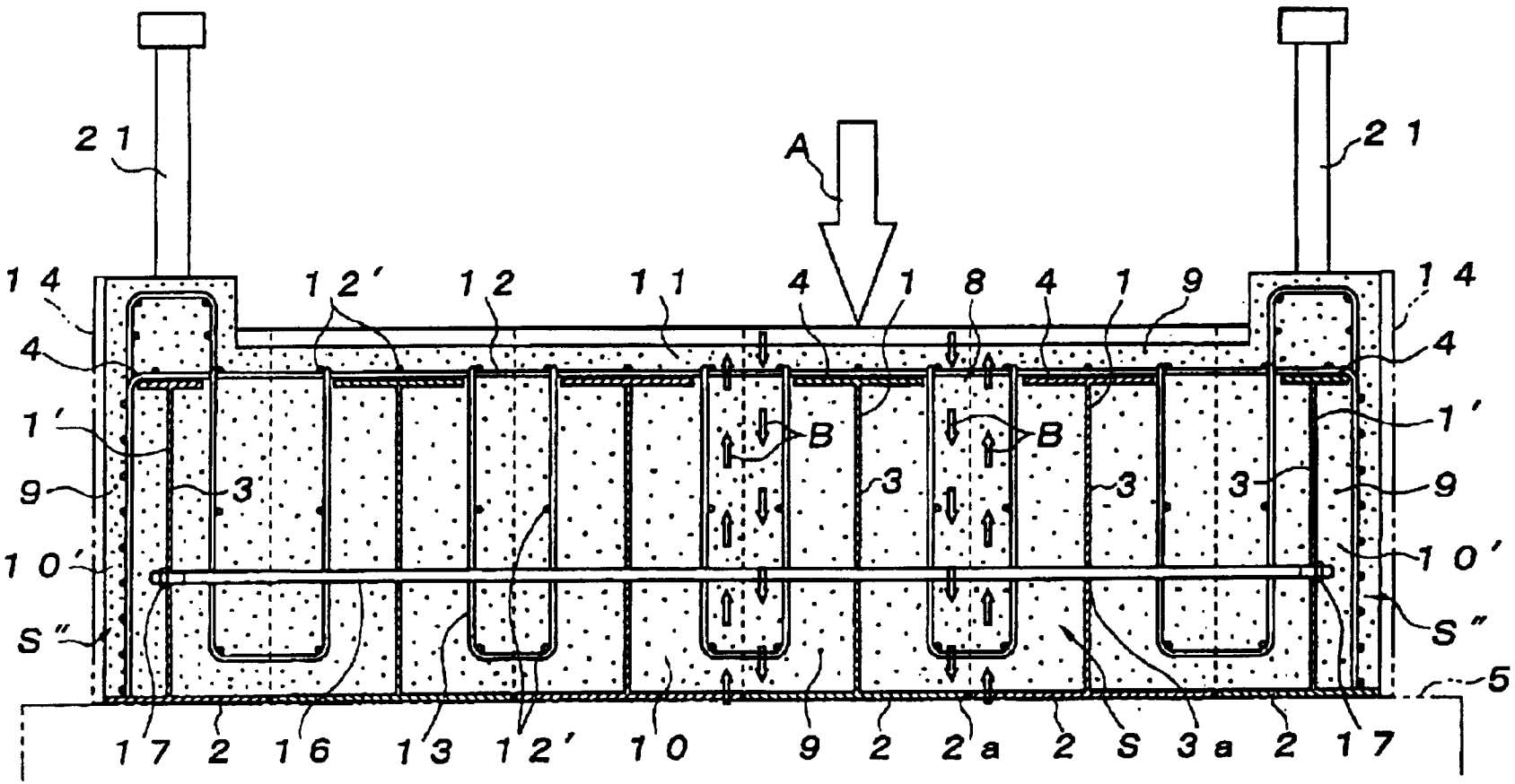
FIG. 1 is a lateral sectional view showing a structure of a floor slab bridge formed of a columnar H-shaped steel and by concrete placement.
Figure 2:
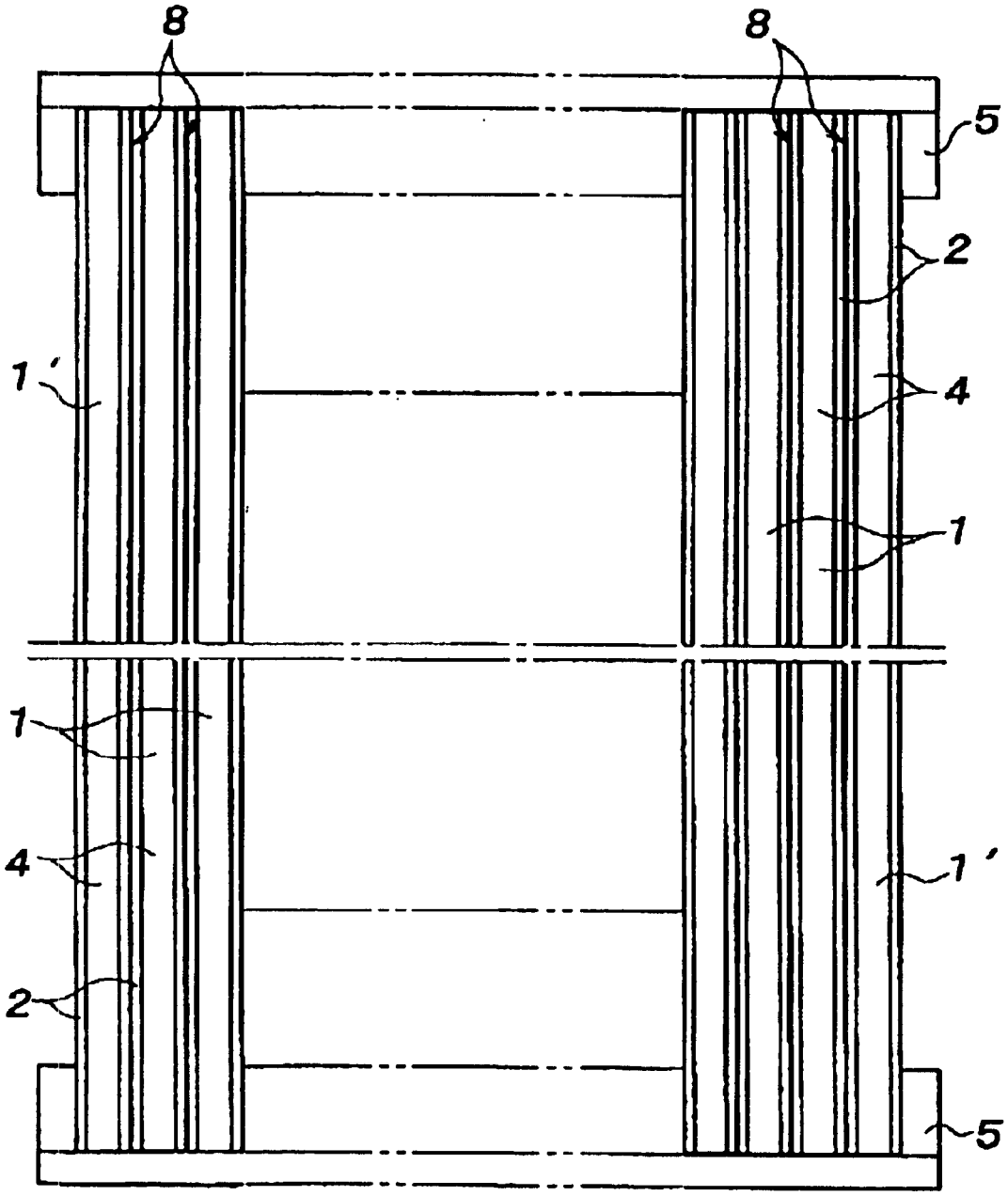
FIG. 2 is a plan view showing a state of columnar H-shaped steels set up in side-by-side relation for construction of a bridge before a concrete placement is made.
Figure 3:
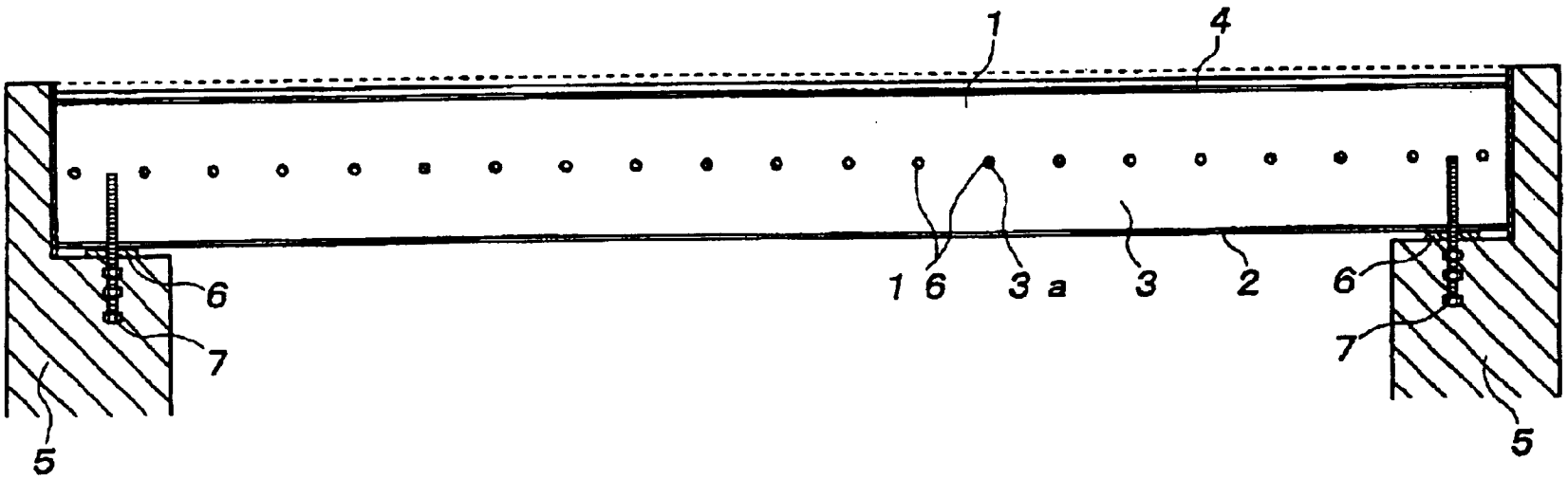
FIG. 3 is a side view of the structure shown in FIG. 2.
Figure 8:
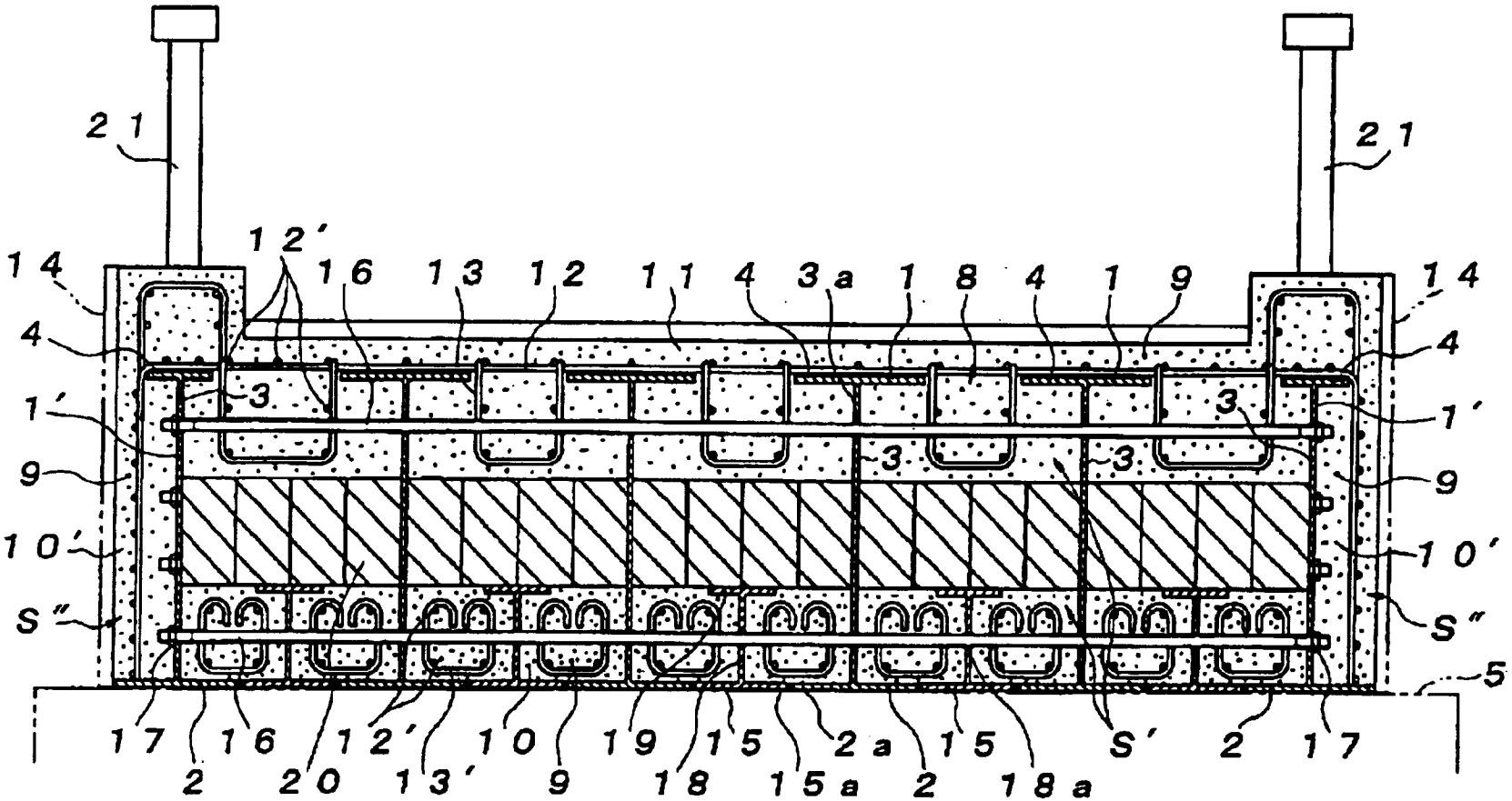
FIG. 8 is a cross sectional view of a floor slab bridge showing an example in which a light-weight material is applied to the bridge.
Figure 9:
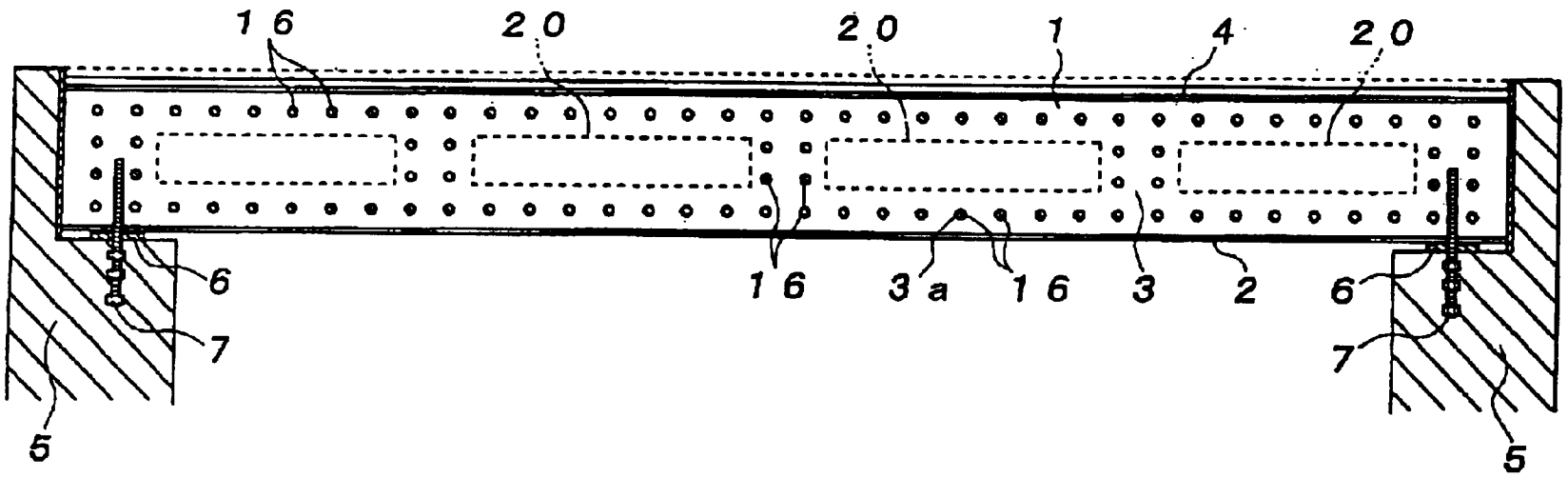
FIG. 9 is a side view of the structure shown in FIG. 8.

As shown in FIGS. 1, 2, 6 and 8, a plurality of columnar H-shaped steels 1 each having a lower flange 2 and an upper flange 4 joined together through a web plate 3, that is, a plurality of commercially available H-shaped steels of JIS specifications, are used. As shown in FIGS. 2, 3 and 9, the columnar H-shaped steels 1 are arranged in side-by-side relation between adjacent bridge legs 5 such that end faces 2a of the adjacent lower flanges 2 are abutted with each other.

As shown in FIGS. 3 and 9, the opposite ends of the columnar H-shaped steel 1 are supported on seat surfaces of the adjacent bridge legs 5, 5 through rubber bearings 6 or the like, and the opposite ends of the lower flanges 2 are attached to the bridge legs 5 through anchor bolts 7.

Figure 4:
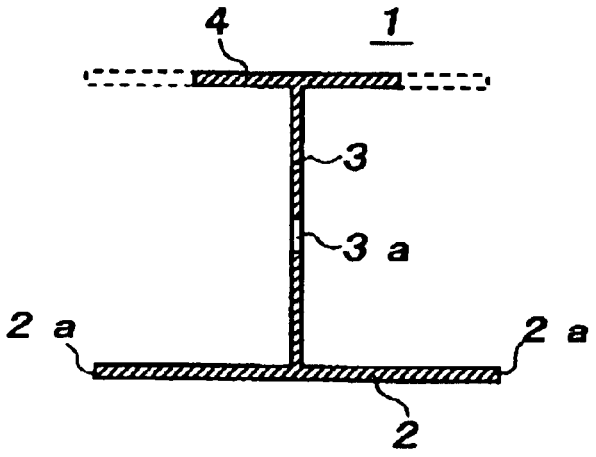
FIG. 4 is a lateral sectional view showing an example in which a concrete inlet port is formed in the columnar H-shaped steel.

As shown in FIG. 4, each upper flange 4 is smaller in width than each lower flange 2, so that a concrete inlet port 8 of FIG. 1 is formed between the adjacent upper flanges 4.

As the columnar H-shaped steel 1, a steel column of JIS specifications (JISG3101 steel material, JISG3106 steel material, JISG3114 steel material) which is composed of a lower flange 2, an upper flange 4 and a web plate 3 is used. As shown in FIG. 4, opposite end parts of the upper flanges 4 of the respective columnar H-shaped steels 1 are cut off by the same width portions so that the upper flanges 4 are smaller in width than the lower flanges 2. The columnar H-shaped steels 1 having such dimensioned upper and lower flanges 4, 2 are prepared beforehand and can be carried to a site.

Figure 5:
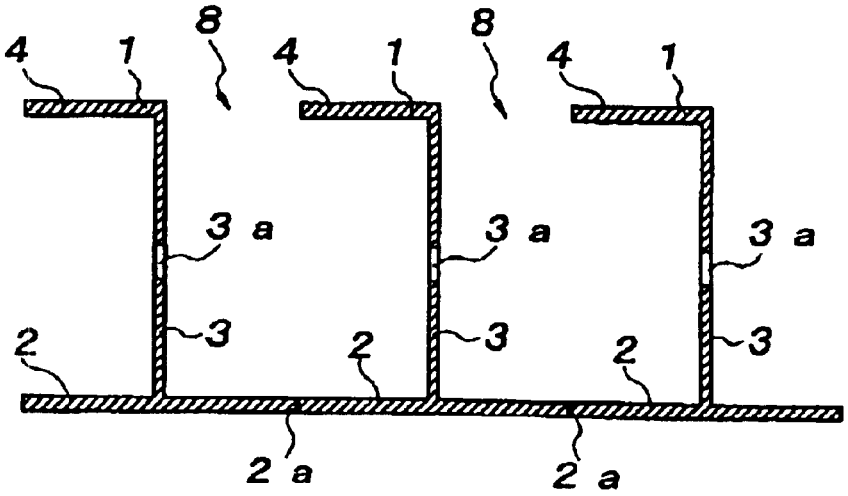
FIG. 5 is a lateral sectional view showing another example in which a concrete inlet port is formed in the columnar H-shaped steel.

As shown in FIG. 5, one half part of the upper flange 4 of each columnar H-shaped steel 1 is cut off at the joining part with respect to the web plate 3. A plurality of columnar H-shaped steels 1 each having such an upper flange 4 are arranged in side-by-side relation with the adjacent lower flanges 2 abutted with each other to thereby form the concrete inlet port 8.

As shown in FIG. 1, concrete 9 is placed in a space S which is defined between each upper and lower flanges 4,2 and between the adjacent web plates 3 through the concrete inlet port 8 so that a lower concrete layer 10 is formed.

Moreover, the concrete 9 is placed on each upper flange 4 to form an upper concrete layer 11 which is connected to the corresponding lower concrete layer 10 through the concrete inlet port 8.

Plating such as zinc plating, or coating is applied to the outer surface of the columnar H-shaped steel 1.

Figure 6:
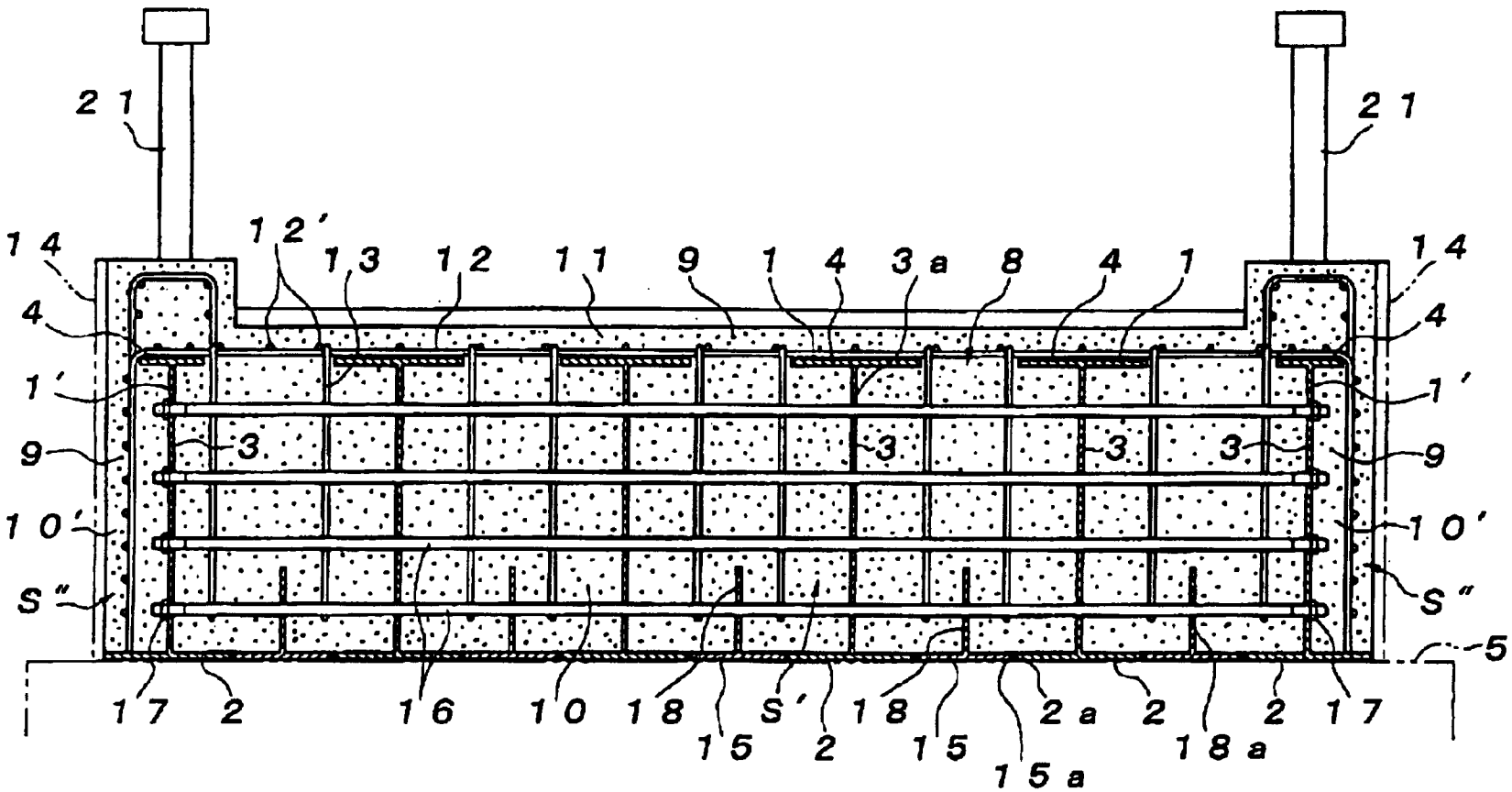
FIG. 6 is a lateral sectional view showing an example of the floor slab bridge in which joining plates are used.

FIG. 6 shows another example. As shown in FIG. 6, a plurality of columnar H-shaped steels of JIS specifications are supported between adjacent bridge legs 5 without applying a width cutting treatment to the upper flanges 4. Lower flanges 2, with a steel joining plate 15 interposed between every adjacent pair of lower flanges 2, are disposed between the adjacent bridge legs 5. One end face 15a of each joining plate 15 is arranged in abutment relation with a corresponding end face 2a of the adjacent lower flange 2 and the other end face 15a of each joining plate 15 is arranged in abutment relation with the other end face 2a of the adjacent lower flange 2. A concrete inlet port 8 is formed between every adjacent pair of upper flanges 4 with the help of the joining plate 15. As shown in FIGS. 6 and 8, concrete is placed in space S' formed between the upper flange 4 and the lower flange 2 and between the adjacent web plates 3 through the concrete inlet port 8 to thereby form a lower concrete layer 10.

Then, concrete is placed on each upper flange 4 to form an upper concrete layer 11 which is connected to the lower concrete layer 10 through the concrete inlet port 8.

In the example of FIG. 1, the columnar H-shaped steels 1 of JIS specifications, each having an upper flange 4 which is cut in such a manner so as to have a predetermined width, are arranged in side-by-side relation between the adjacent bridge legs 5 and concrete is placed thereon. Merely by doing so, a floor slab bridge can be constructed at a low cost and with a reduced amount of labor time.

In the example of FIGS. 6 and 8, a plurality of columnar H-shaped steels 1 of JIS specifications are supported between adjacent bridge legs 5 without applying a width cutting treatment to the upper flanges 4, and concrete 9 is placed thereon. Merely by doing so, a floor slab bridge can be constructed at a low cost and with a reduced amount of labor time.

As shown in FIGS. 1, 6 and 8, a form side plate 14 is assembled to the outer side of each of the leftmost and rightmost columnar H-shaped steels 1' (each columnar H-shaped steel located at the left extreme end or at the right extreme end in the width direction of the bridge), and concrete is placed on the outer side part of the columnar H-shaped steel 1' to thereby form a side concrete layer 10'.

In other words, concrete 9 is placed in a space S" which is defined by the lower flange 2, the web plate 3, the upper flange 4 and the form side plate 14 of the columnar H-shaped steel 1' to thereby form a side concrete layer 10'.

The form side plates 14 are removed after the concrete 9 is cured. In actual practice, the lower concrete layer 10, the upper concrete layer 11 and the side concrete layers 10' are not formed by placing the concrete 9 separately. Instead, by continuously placing the concrete 9, the side concrete layers 10" are integrally formed (or placed) on the opposite ends of the upper concrete layer 11. A parapet 21 is integrally erected on the upper end of each concrete layer 10'.

Each joining plate 15 has generally the same thickness as the lower flange 2. The joining plates 15 and the columnar H-shaped steels 1 are alternately arranged between the bridge legs 5. The joining plate 15 makes it possible to form the concrete inlet port 8 in case the commercially available columnar H-shaped steel 1 is used in which the upper flange 4 is not partly cut off. The width dimension is established by properly selecting the width of the joining plate 15.

Figure 7:
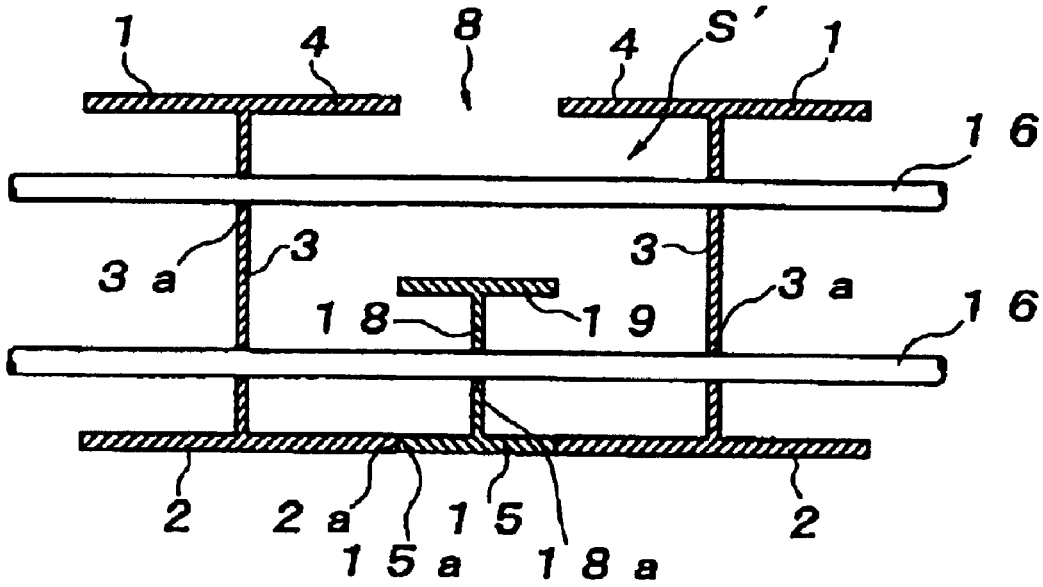
FIG. 7 is a cross sectional view exemplifying a relation among the joining plate, the columnar H-shaped steels and web through-bars.

As shown in FIGS. 6, 7 and 8, each joining plate 15 is provided with a reinforcement plate 18 which is erected from the center of the upper surface thereof and embedded in the lower concrete layer 10. The joining plate 15 in combination with the reinforcement plate 18 exhibit a T-shaped configuration. Therefore, either by applying a commercially available T-shaped steel, or a T-shaped steel formed by partly cutting off the upper flange of the commercially available columnar H-shaped steel, the joining plate 15 and the reinforcement plate 18 are formed.

As shown in FIG. 7, the reinforcement plate 18 is provided at an upper end thereof with a flange 19 which is integral with the joining plate 15 and the reinforcement plate 18 and in parallel with the joining plate 15. That is, a steel material, which includes the joining plate 15, the reinforcement plate 18 and the flange 19, is in the form of the columnar H-shaped steel. The commercially available columnar H-shaped steel 1 of JIS specifications, the joining plate 15 formed by the lower flange of the commercially available columnar H-shaped steel 1, the reinforcement plate 18 and the upper flange 19 are embedded in the lower concrete layer 10.

In the same manner as described above, plating such as zinc plating, or coating is applied to the outer surface of the columnar H-shaped steel 1. Similarly, plating such as zinc plating, or coating is applied to the outer surface of the columnar T-shaped or H-shaped steel which constitutes the joining plate 15 and the reinforcement plate 18.

By the reinforcement plate 18 and upper flange 19, the main girder component member of a bridge is further increased in strength and the joining plate 15 and the lower concrete layer 10 are firmly connected together. Of course, the columnar H-shaped steel composing the joining plate 15 is smaller than the columnar H-shaped steel which composes the main girder.

Moreover, an iron reinforcement is horizontally laid on the upper flange 4, and the suspending iron reinforcement 13 is assembled with the horizontal iron reinforcement 12. The suspending iron reinforcement 13 is suspended in the space S, S' through the concrete inlet port 8. The horizontal iron reinforcement 12 is embedded in the upper concrete layer 11, and the suspending iron reinforcement 13 is embedded in the lower concrete layer 10. By doing so, a floor slab bridge can be constructed.

In the same manner as mentioned above, the suspending iron reinforcements 13 are suspended in the left and right outer space S" of the leftmost and rightmost columnar H-shaped steels 1', and the suspended iron reinforcements 13 are embedded in the side concrete layers 10'.

Each suspending iron reinforcement 13 is, as shown in FIG. 1, is formed in a U-shaped configuration in the width direction of the bridge, and, as shown in FIG. 6, formed in a U-shaped configuration in the longitudinal direction of the bridge. The opposite upper ends of each suspending iron reinforcement 13 are assembled with the horizontal iron reinforcement 12 in a suspending manner.

The horizontal iron reinforcement 12 is supported on the upper surface of the upper flange 4 so as to bear the horizontal iron reinforcement 12 and suspending iron bar 13. Of course, a plurality of such plural iron reinforcements 12, 13 are arranged at small intervals in the longitudinal direction of the H-shaped steel 1.

Moreover, vertical iron reinforcements 12' extending in the longitudinal direction of the bridge are assembled with the horizontal iron reinforcements 12 and the suspending iron reinforcements 13 so as to form a basket shape as a whole. The vertical iron reinforcements 12' are also supported on the horizontal iron reinforcements 12 which are horizontally supported on the upper flanges 4.

By the horizontal iron reinforcements 12 and the suspending iron reinforcements 13 suspended therefrom, the joining strength between the upper concrete layer 11 and the lower concrete layer 12, particularly the lower concrete layer 10 demarcated by the web plate 3 is properly reinforced, thereby providing a sufficient strength to the entire floor slab bridge.

Thus, the shearing resisting force of the concrete 9 against the live load is increased to effectively prevent cracking of the upper and lower concrete layers 11, 10.

As another example, as shown in FIGS. 1, 5 and 8, a through hole 3a is formed in each web plate 3 of the columnar H-shaped steel 1 in which the adjacent lower flanges 2 are directly or indirectly abutted with each other. A web through-bar 16 is allowed to pierce through this through hole 3a. As shown in FIGS. 3 and 9, a plurality of such web through-bars 16 are arranged at small intervals in the longitudinal direction of the bridge. Each web through-bar 16 is provided at both ends thereof with stoppers 17 such as nuts which are to be abutted with the outer side surfaces of the web plates 3 of the leftmost and rightmost columnar H-shaped steels 1'.

As shown in FIG. 3, a plurality of such web through-bars 16 are arranged in a single row at small intervals in the longitudinal direction of the bridge. Alternatively, as shown in FIG. 9, the web through-bars 16 are arranged in upper and lower rows.

Each web through-bar 16 is embedded in the lower concrete layer 10 which is formed by placing the concrete through the concrete inlet port 8, so as to serve as a concrete reinforcement.

Both ends of each web through-bar 16 and each stopper 17 are embedded in the side concrete layers 10' which are formed by placing the concrete on the outer side surfaces of the leftmost and rightmost columnar H-shaped steels 1'.

The web through-bar 16 is preferably of the type having a head (stopper 17) at one end thereof. A nut (stopper 17) is threadingly engaged with the other end of the web through-bar 16 so as to fasten to the outer side surfaces of the web plate 3 of the leftmost and rightmost columnar H-shaped steels 1'. It is also accepted that a nut is threadingly engaged with each end of the web through-bar 16 so as to fasten to the outer side surfaces of the leftmost and rightmost columnar H-shaped steels 1'.

This fastening force is preferably not so large as to give an abutting force to the abutting parts of the adjacent lower flanges 2 of the columnar H-shaped steels. That is, it is preferred that the adjacent lower flanges of the columnar H-shaped steels 1 are merely loosely contacted (a small space may be formed between the adjacent lower flanges) with each other.

The web through-bar 16 is embedded in the lower concrete layer 10 so as to serve as a concrete reinforcement. That is, as shown in FIG. 1, if a vertical load A attributable to passage of vehicles, etc. is applied to the floor slab bridge, a shearing force B would act on the joining part between the columnar H-shaped steel 1 (or joining plate 15) which is under the load and its adjacent columnar H-shaped steel 1 (or joining plate 15) and the concrete layers 10, 11 corresponding to the joining part. However, the web through-bar 16 effectively prevents the induction of cracking (shearing) of the concrete layers 10, 11 caused by the vertical load A.

Similarly, the horizontal iron reinforcement 12 and the suspending iron reinforcement 13 in combination with the concrete 9 (concrete layers 10, 11) increase the shearing preventive effect. The iron reinforcements 12, 13 may be used in combination with the web through-bar 16. By embedding the stoppers and the opposite ends of the web through-bars in the side concrete layers, they can be prevented from becoming rotten due to wind and rain, and the outer appearance is not spoiled. Moreover, the web through bars 16 can be kept wholesome so that they can fully exhibit their function in spite of the passage of time.

As shown in FIGS. 6, 7 and 8, in case a reinforcement plate 18 is erected from each joining plate 15, a through hole 18a may be formed in each reinforcement plate 18 so that the web through-bar 16 can pierce through the through hole 18a in the manner as mentioned above.

As still another example, as shown in FIGS. 8 and 9, a light-weight material 20 such as foamed resin or foamed concrete is disposed in each space S' which is defined among each upper flange 4, each web plate 3, each lower flange 2 and each joining plate 15, or in the example of FIG. 1, in each space S which is defined among each upper flange 4, each web plate 3 and each lower flange 2, and embedded in the lower concrete layer 10.

The light-weight material 20 is preferably in the form of a rectangular block. This light-weight material 20 is interposed between adjacent web plates 3 and intimately contacted therewith. The light-weight material 20 is placed and supported on the upper flange 19 or reinforcement plate 18 of the columnar H-shaped steel.

A plurality of such light-weight materials 20 are, as shown in FIG. 9, arranged in the longitudinal direction of the bridge so as not to interfere with the web through-bars 16. By doing so, while increasing the thickness of the lower concrete layer 10, i.e., by using a large sized columnar H-shaped steel 1 having a large height, the overall weight can be reduced (reduction of dead load) in spite of the increased thickness of the entire floor plate which is required for filling the light-weight material 20 therein.

The light-weight material 20 is embedded in the central part of the lower concrete layer 10, while the web through-bars 16 are inserted in the lower concrete layer part on the upper flange 4 side and in the lower concrete layer part on the lower flange 2 side which are demarcated by the light-weight material 20.

The web through-bar 16, which is inserted into the lower concrete layer part on the lower flange 2 side, is inserted in the reinforcement plate 18 and embedded in the concrete 9. As shown in FIG. 6, even in case the light-weight material 20 is not filled, the web through-bar 16 may be inserted in the reinforcement plate 18.

The suspending iron reinforcement 13 and the web through-bar 16 are provided in the upper space of the light-weight material 20 and the concrete 9 is placed thereon, and then embedded in the lower concrete layer part on the upper flange 4 side. A plurality of reinforcements 13' each formed in the shape of a ring are arranged in the widthwise direction and in the longitudinal direction of the bridge within the space in a lower part of the light-weight material 20, and the vertical iron reinforcements 12' are assembled with the ring-shape iron reinforcements 13' so as to form a basket shape, and embedded in the concrete layer filled in the lower space, i.e., in the lower concrete layer part on the lower flange 2 side. The horizontal iron reinforcements 12 and the suspending iron reinforcements 13 may be used in combination with the joining plates 15 and the web through-bars 16, where appropriate. By doing so, those elements can function synergistically.

What is claimed is:

1. A structure of a floor slab bridge comprising:

a plurality of columnar H-shaped steels each of which includes a web plate having at an upper end thereof an upper flange and at a lower end thereof a lower flange, said columnar H-shaped steels being arranged in side-by-side relation with an end face thereof abutted with a corresponding end face of the adjacent columnar H-shaped steel, said upper flanges being smaller in width than said lower flanges so that a concrete inlet port is formed between adjacent upper flanges;

a lower concrete layer formed by placing concrete in a space defined between said upper and lower flanges and between the adjacent web plates through said concrete inlet ports;

an upper concrete layer formed by placing concrete on said upper flanges and connected to said lower concrete layer through said concrete inlet ports;

a horizontal reinforcement horizontally laid on each of said upper flanges;

a suspending reinforcement suspended in each of said spaces through said concrete inlet ports; and said horizontal reinforcements being embedded in said upper concrete layer and said suspending reinforcements being embedded in said lower concrete layer.

2. A structure of a floor slab bridge according to claim 1, further comprising:

a first stopper that abuts an outer side surface of a leftmost columnar H-shaped steel;

a second stopper that abuts an outer side surface of a rightmost columnar H-shaped steel; and a plurality of web through-bars arranged in a longitudinal direction of said bridge at given intervals, wherein each of said web through-bars pierces through at least one of said web plates.

3. A structure of a slab floor bridge according to claim 2, further comprising:

a first side concrete layer disposed on an outer side surface of said leftmost columnar H-shaped steel; and a second side concrete layer disposed on an outer side surface of said rightmost columnar H-shaped steel, wherein said first stopper and a first end of each of said web-through bars are embedded in said first side concrete layer, wherein said second stopper and a second end of each of said web-through bars are embedded in said second side concrete layer, and wherein each of said web through-bars is embedded in said lower concrete layer.

4. A structure of a floor slab bridge according to claim 2, further comprising:

a light weight material embedded in said lower concrete layer, wherein said light weight material is disposed so as not to interfere with said web through-bars.

5. A structure of a floor slab bridge according to claim 1, wherein said horizontal reinforcement and said suspending reinforcement are formed of iron.

6. A structure of a floor slab bridge comprising:

a plurality of columnar H-shaped steels each of which includes a web plate having at an upper end thereof an upper flange and at a lower end thereof a lower flange;

a joining plate [made of a steel material] interposed between every adjacent pair of said lower flanges, wherein left and right end faces of each of said joining plates are in abutment relation with corresponding end faces of said lower flanges of adjacent ones of said left and right columnar H-shaped steels;

a concrete inlet port formed between every adjacent pair of said upper flanges with the help of said joining plates;

a lower concrete layer formed by placing concrete in a space formed between the upper and lower flanges and between adjacent ones of said web plates through said concrete inlet ports;

an upper concrete layer formed by placing concrete on said upper flanges, wherein said upper concrete layer is connected to said lower concrete layer through said concrete inlet ports;

a horizontal reinforcement horizontally laid on each of said upper flanges; and a suspending reinforcement suspended in each of said spaces through said concrete inlet ports, wherein said horizontal reinforcements are embedded in said upper concrete layer and said suspending reinforcements are embedded in said lower concrete layer.

7. A structure of a floor slab bridge according to claim 6, further comprising:

a first stopper that abuts an outer side surface of a leftmost columnar H-shaped steel;

a second stopper that abuts an outer side surface of a rightmost columnar H-shaped steel; and a plurality of web through-bars arranged in a longitudinal direction of said bridge at given intervals, wherein each of said web through-bars pierces through at least one of said web plates.

8. A structure of a slab floor bridge according to claim 7, further comprising:

a first side concrete layer disposed on an outer side surface of said leftmost columnar H-shaped steel; and a second side concrete layer disposed on an outer side surface of said rightmost columnar H-shaped steel, wherein said first stopper and a first end of each of said web-through bars are embedded in said first side concrete layer, wherein said second stopper and a second end of each of said web-through bars are embedded in said second side concrete layer, and wherein each of said web through-bars is embedded in said lower concrete layer.

9. A structure of a floor slab bridge according to claim 7, further comprising:

a light weight material embedded in said lower concrete layer, wherein said light weight material is disposed so as not to interfere with said web through-bars.

10. A structure of a floor slab bridge according to claim 6, wherein said horizontal reinforcement and said suspending reinforcement are formed of iron.

11. A structure of a floor slab bridge comprising:

a plurality of columnar H-shaped steels each of which includes a web plate having at an upper end thereof an upper flange and at a lower end thereof a lower flange;

a joining plate [made of a steel material] interposed between every adjacent pair of said lower flanges, wherein left and right end faces of each of said joining plates are in abutment relation with corresponding end faces of said lower flanges of adjacent ones of said left and right columnar H-shaped steels;

a concrete inlet port formed between every adjacent pair of said upper flanges with the help of said joining plates;

a lower concrete layer formed by placing concrete in a space formed between the upper and lower flanges and between adjacent ones of said web plates through said concrete inlet ports; and an upper concrete layer formed by placing concrete on said upper flanges, wherein said upper concrete layer is connected to said lower concrete layer through said concrete inlet ports, and wherein, for each of said joining plates, said joining plate is provided with a reinforcement plate, a part of which is erected from an upper surface of said joining plate and the rest of which is embedded in said lower concrete layer.

12. A structure of a floor slab bridge according to claim 11, further comprising:

a first stopper that abuts an outer side surface of a leftmost columnar H-shaped steel;

a second stopper that abuts an outer side surface of a rightmost columnar H-shaped steel; and a plurality of web through-bars arranged in a longitudinal direction of said bridge at given intervals, wherein each of said web through-bars pierces through at least one of said web plates.

13. A structure of a floor slab bridge according to claim 12, further comprising:

a first side concrete layer disposed on an outer side surface of said leftmost columnar H-shaped steel; and a second side concrete layer disposed on an outer side surface of said rightmost columnar H-shaped steel, wherein said first stopper and a first end of each of said web-through bars are embedded in said first side concrete layer, wherein said second stopper and a second end of each of said web-through bars are embedded in said second side concrete layer, and wherein each of said web through-bars is embedded in said lower concrete layer.

14. A structure of a floor slab bridge according to claim 12, further comprising:

a light weight material embedded in said lower concrete layer, wherein said light weight material is disposed so as not to interfere with said web through-bars.

15. A structure of a floor slab bridge comprising:

a plurality of columnar H-shaped steels each of which includes a web plate having at an upper end thereof an upper flange and at a lower end thereof a lower flange;

a joining plate [made of a steel material] interposed between every adjacent pair of said lower flanges, wherein left and right end faces of each of said joining plates are in abutment relation with corresponding end faces of said lower flanges of adjacent ones of said left and right columnar H-shaped steels;

a concrete inlet port formed between every adjacent pair of said upper flanges with the help of said joining plates;

a lower concrete layer formed by placing concrete in a space formed between the upper and lower flanges and between adjacent ones of said web plates through said concrete inlet ports; and an upper concrete layer formed by placing concrete on said upper flanges, wherein said upper concrete layer is connected to said lower concrete layer through said concrete inlet ports, wherein each of said joining plates has a planar shape, and wherein each of said joining plates has generally a same thickness as each of said lower flanges.

16. A structure of a floor slab bridge according to claim 15, further comprising:

a first stopper that abuts an outer side surface of a leftmost columnar H-shaped steel;

a second stopper that abuts an outer side surface of a rightmost columnar H-shaped steel; and a plurality of web through-bars arranged in a longitudinal direction of said bridge at given intervals, wherein each of said web through-bars pierces through at least one of said web plates.

17. A structure of a floor slab bridge according to claim 16, further comprising:

a first side concrete layer disposed on an outer side surface of said leftmost columnar H-shaped steel; and a second side concrete layer disposed on an outer side surface of said rightmost columnar H-shape steel, wherein said first stopper and a first end of each of said web-through bars are embedded in said first said concrete layer, wherein said second stopper and a second end of each of said web-through bars are embedded in said second side concrete layer, and wherein each of said web through-bar is embedded in said lower concrete layer.

18. A structure of a floor slab bridge according to claim 16, further comprising:

a light weight material embedded in said lower concrete layer, wherein said light weight material is dispose so as not interfere with said web through-bars.

* * * * *